United States Patent
Robisson et al.

(10) Patent No.: US 8,783,349 B2
(45) Date of Patent: Jul. 22, 2014

(54) COMPLIANT SAND SCREEN

(75) Inventors: Agathe Robisson, Cambridge, MA (US); Francois M. Auzerais, Boston, MA (US); Sudeep Maheshwari, Cambridge, MA (US); Partha Ganguly, Sugar Land, TX (US); S. Sherry Zhu, Waban, MA (US)

(73) Assignee: Schlumber Technology Corporation, Sugar Land, TX (US)

( * ) Notice: Subject to any disclaimer, the term of this patent is extended or adjusted under 35 U.S.C. 154(b) by 245 days.

(21) Appl. No.: 13/464,682

(22) Filed: May 4, 2012

(65) Prior Publication Data

US 2013/0292117 A1 Nov. 7, 2013

(51) Int. Cl.
*E21B 43/10* (2006.01)

(52) U.S. Cl.
USPC .......................................... 166/278; 166/228

(58) Field of Classification Search
USPC ........................................ 166/276, 278, 228
See application file for complete search history.

(56) References Cited

U.S. PATENT DOCUMENTS

| | | | |
|---|---|---|---|
| 3,099,318 A | 7/1963 | Miller et al. | |
| 5,913,365 A | 6/1999 | Bryant | |
| 6,543,545 B1 | 4/2003 | Chatterji et al. | |
| 6,766,862 B2 | 7/2004 | Chatterji et al. | |
| 6,935,432 B2 | 8/2005 | Nguyen | |
| 7,013,979 B2 | 3/2006 | Richard | |
| 7,168,485 B2 | 1/2007 | Johnson et al. | |
| 7,318,481 B2 | 1/2008 | Richard | |
| 7,373,991 B2 * | 5/2008 | Vaidya et al. | 166/381 |
| 7,644,773 B2 | 1/2010 | Richard | |
| 7,665,538 B2 * | 2/2010 | Robisson et al. | 166/387 |
| 7,743,835 B2 | 6/2010 | Willauer | |
| 7,926,565 B2 | 4/2011 | Duan et al. | |
| 8,490,707 B2 * | 7/2013 | Robisson et al. | 166/387 |
| 2003/0089495 A1 | 5/2003 | Bixenman | |
| 2005/0034860 A1 | 2/2005 | Lauritzen | |
| 2005/0056425 A1 | 3/2005 | Grigsby et al. | |
| 2008/0264647 A1 * | 10/2008 | Li | 166/373 |
| 2009/0151942 A1 | 6/2009 | Bernardi, Jr. | |
| 2009/0173497 A1 * | 7/2009 | Dusterhoft | 166/276 |
| 2010/0069469 A1 | 3/2010 | Young et al. | |
| 2011/0086942 A1 | 4/2011 | Robisson et al. | |
| 2011/0098202 A1 * | 4/2011 | James et al. | 507/225 |
| 2011/0247813 A1 | 10/2011 | Moen | |
| 2011/0303411 A1 | 12/2011 | Todd et al. | |

FOREIGN PATENT DOCUMENTS

GB 2421527 A 6/2006

OTHER PUBLICATIONS

Carrejo, et al., "The Effects of Dynamic Loading on the Sand Management and Permeability of Shape Memory Polymer and Gravel Packs for Sand Management Applications", SPE 143060—Brasil Offshore, Macae, Brazil, Jun. 14-17, 2011, 9 pages.
Crossland, et al., "A Bicontinuous Double Gyroid Hybrid Solar Cell", Nano Letters, vol. 9 (8), 2009, pp. 2807-2812.

(Continued)

*Primary Examiner* — William P Neuder
(74) *Attorney, Agent, or Firm* — Bridget Laffey; Jakub M. Michna

(57) ABSTRACT

Embodiments disclose a sand screen apparatus for use in a well that intersects a hydrocarbon formation. The sand screen apparatus comprises a composite, the composite having a compressed state and an expanded state. In embodiments, the composite comprises a base polymer and one or a plurality of reactive fillers where the reactive fillers react with the base polymer in the expanded state after exposure to a first trigger.

26 Claims, 7 Drawing Sheets

(56) References Cited

OTHER PUBLICATIONS

Wang, et al., "Co-Continuous Composite Materials for Stiffness, Strength, and Energy Dissipation", Advanced Materials, vol. 23 (13), Apr. 5, 2011, pp. 1524-1529.

Wei, et al., "Review shape memory materials and hybrid composites for smart systems", J. Mater. Sci., vol. 33, 1998, pp. 3763-3783.

Yuan, et al., "In-Situ Mechanical and Functional Behavior of Shape Memory Polymer Materials for Sand Management Applications", SPE 143204—Brasil Offshore, Macae, Brazil, Jun. 14-17, 2011, 10 pages.

Zalusky, et al., "Ordered Nanoporous Polymers from Polystyrene-Polylactide Block Copolymers", J. Am. Chem. Soc., vol. 124 (43), 2002, pp. 12761-12773.

International Search Report and Written Opinion issued in PCT/US2013/036100 on Jul. 10, 2013, 13 pages.

Gibson, et al., "Cellular Solids: Structure & Properties", Pergamon Press, Oxford, 1988, pp. 183.

Van Krevelen, et al., "Properties of Polymers", 4th Edition, Elsevier B.V., New York, 2009, pp. 611.

Anonymous, "GeoFORM Conformable Sand Management System Improve reliability through total conformance," Baker Hughes Incorporated, Brochure, 2011: 1-4.

Gibson et al., "(a) Linear elasticity," Cellular solids Structure and properties—Second Edition, Cambridge University Press: New York, 1999: p. 183.

\* cited by examiner

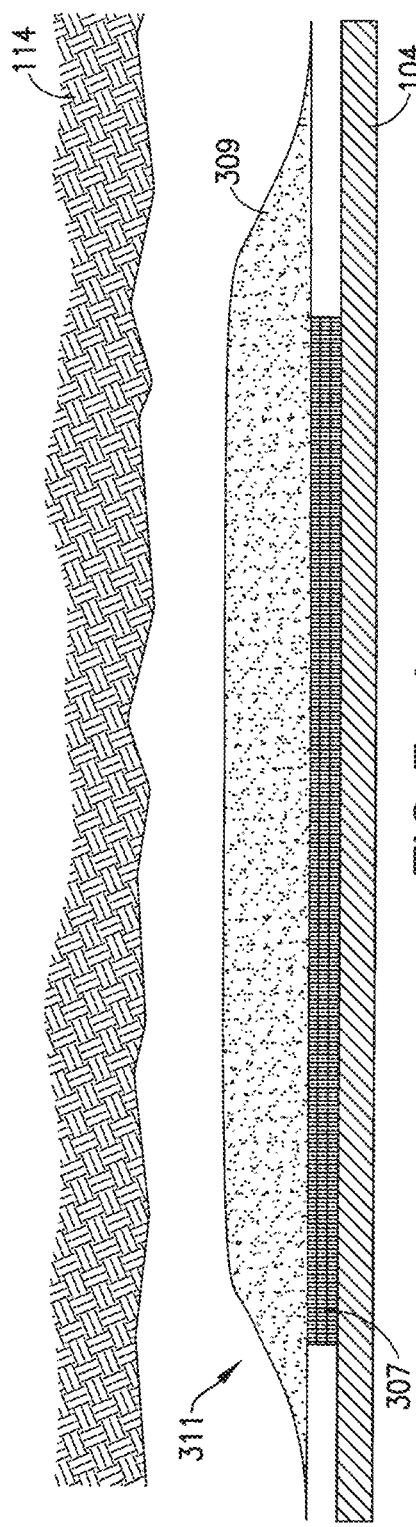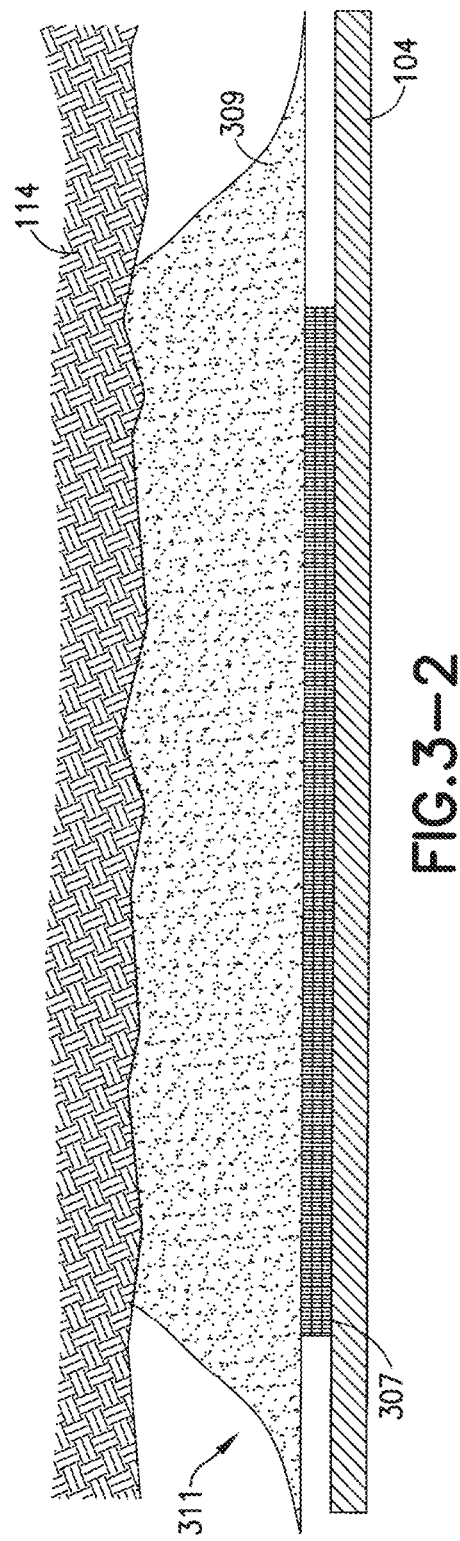

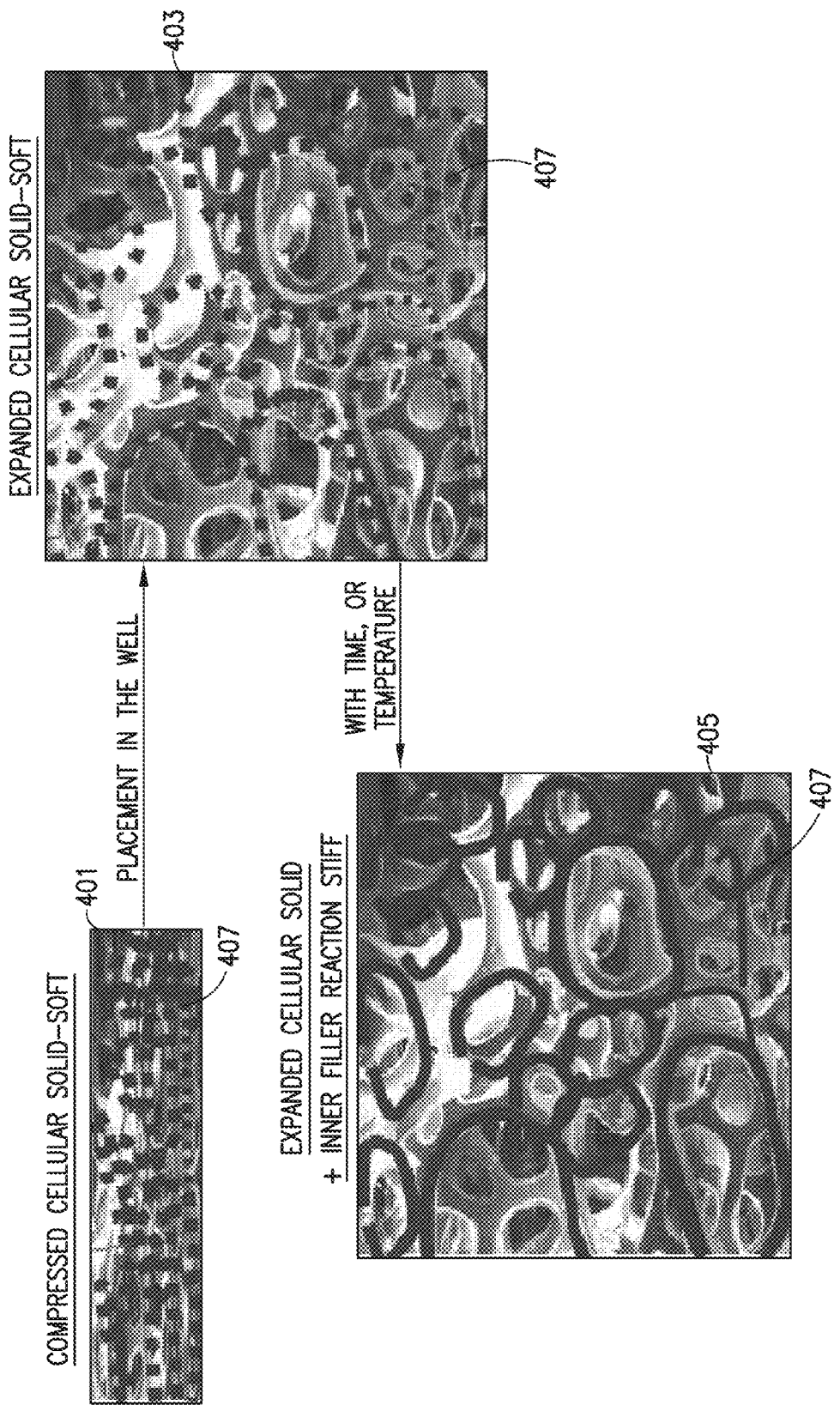

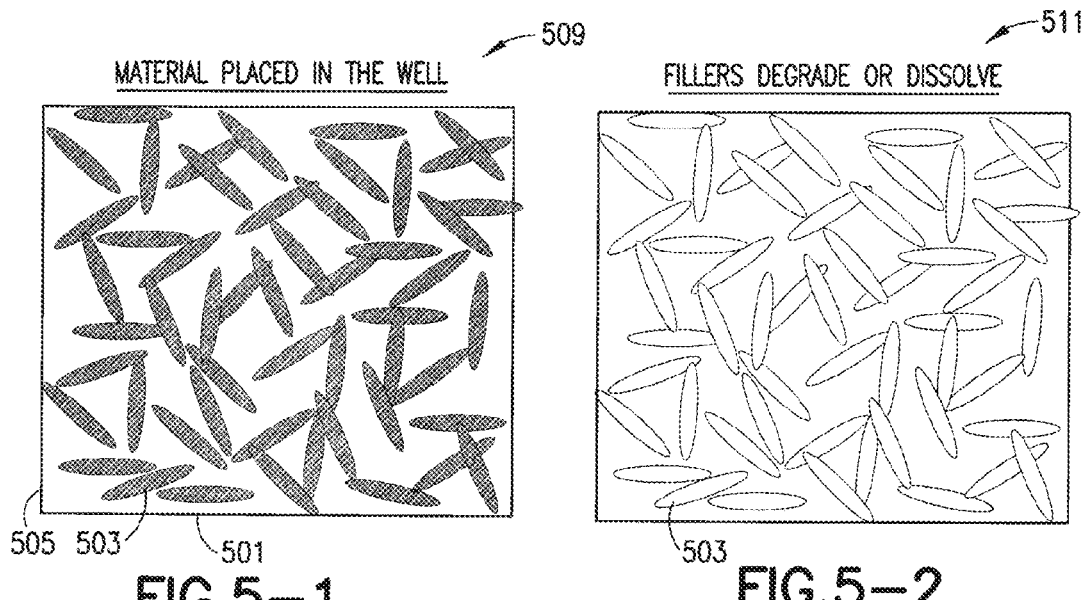
FIG.5-1
FIG.5-2
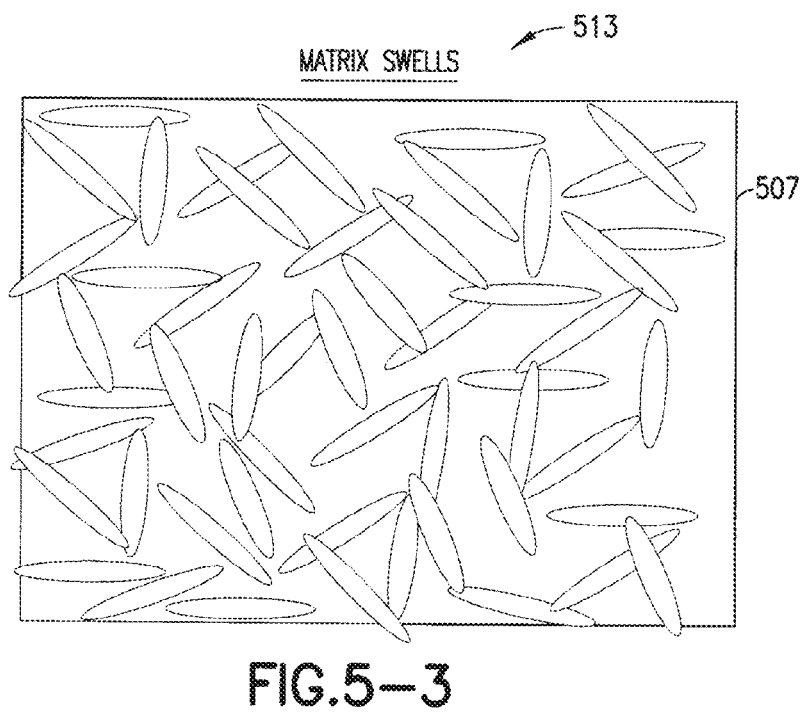
FIG.5-3

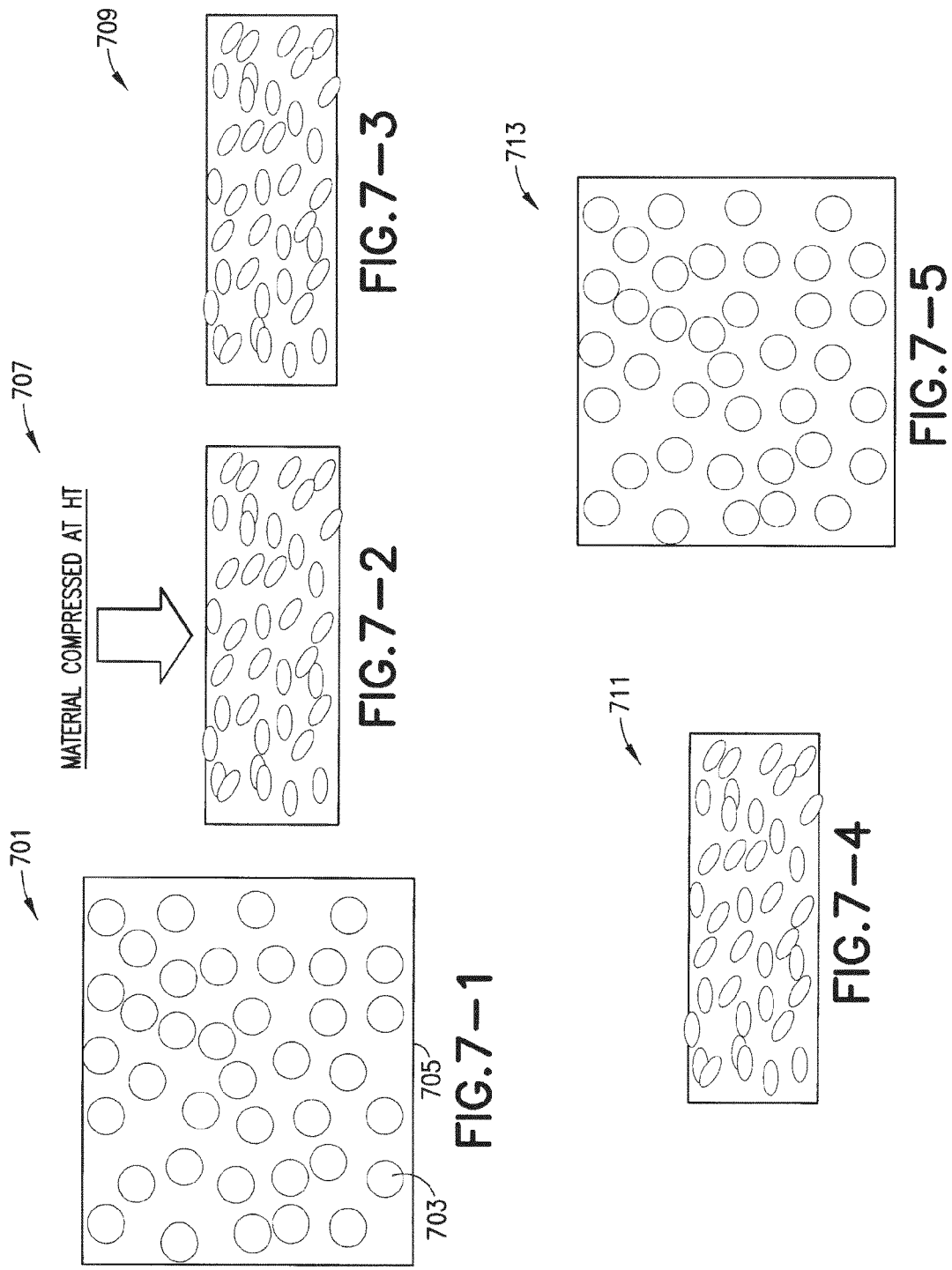

COMPLIANT SAND SCREEN

FIELD

This disclosed subject matter generally relates to wellbore completions, and more particularly to a screen design for sand control.

BACKGROUND

In many hydrocarbon wells, inflowing fluid passes through a sand screen which filters out particulates from the inflowing oil or gas. The sand screen prevents sand from entering the wellbore and reduces damage which may occur by erosion. Conventionally, sand screens are made with a metallic mesh material. Once the sand screen is placed into the wellbore, gravel packs are pumped to fill the annulus between the screen and the formation.

In other instances, some sand screens are expandable and are expanded downhole after placement in the wellbore. The result is a reduction in the annulus between the screen and the formation. The expandable screens in many instances have a limited expansion ratio and the ability of the expandable screen to conform to borehole irregularities may not be satisfactory. Further, the ability of the expandable sand screen to resist borehole collapse may be reduced. Conventional sand screens are rated to resist greater external pressure than expandable sand screens. Expandable sand screens resist less external pressure because of plastic deformation experienced by their metallic components.

Recently, self-expandable polymer screens have been developed. The sand screen comprises a cellular shape memory polymer. The cellular polymer is compressed and stored in a collapsed foam form. It is then placed into a wellbore and expanded by raising a temperature or pumping a triggering fluid. The foam material once in the borehole softens and tries to return to its original expanded shape. The expansion outer diameter was designed to be higher than the borehole internal diameter, resulting in the foam conforming to the borehole. The polymer matrix composing the foam is a thermoset that goes through glass transition and becomes rubbery, releasing internal stresses and therefore expanding the cells. The compliant foam has a large expansion ratio, which depends on the porosity, and as a result can conform to the borehole.

The main advantage of these sand screen systems is compliance and their ability to expand and contact the borehole along the entire length of the borehole even in situations where the borehole is irregularly shaped e.g., uncased borehole, avoiding the need to pump gravel slurries. One of the disadvantages of the foam material used in these sand screens is the weak mechanical properties of these foams. The collapse pressure for a tube made of this foam is lowered when the material is more compliant and the foam is less dense. Screen collapse under wellbore pressure may lead to a loss of permeability and a stuck completion string in the wellbore which may be hard to repair or change.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

According to some embodiments, a sand screen apparatus for use in a well that intersects a hydrocarbon formation is disclosed. The sand screen apparatus comprises a composite, the composite having a compressed state and an expanded state. In embodiments, the composite comprises a base polymer and one or a plurality of reactive fillers where the reactive fillers react with the base polymer in the expanded state after exposure to a first trigger.

According to some other embodiments, a well completion method is disclosed. The well completion method comprises covering at least one base pipe with a composite comprising a base polymer and one or a plurality of reactive fillers. The method further comprises running the base pipe to a location in a wellbore and expanding the composite, the composite conforming to the wellbore wall. The composite then stiffens and allows fluid to filter through the composite to the base pipe.

According to embodiments, a method of completing a wellbore in a subterranean formation is disclosed. The method comprises positioning an expandable sand control device in the wellbore and forming an annulus between the sand control device and the wellbore, the sand control device having a foam composite comprising a base polymer and one or a plurality of reactive fillers, the foam composite designed to expand and fill the annulus.

Further features and advantages of the invention will become more readily apparent from the following detailed description when taken in conjunction with the accompanying drawings.

BRIEF DESCRIPTION OF THE DRAWINGS

The subject disclosure is further described in the detailed description which follows, in reference to the noted plurality of drawings by way of non-limiting examples of embodiments of the subject disclosure, in which like reference numerals represent similar parts throughout the several views of the drawings, and wherein:

FIGS. 3-1 and 3-2 show further details of the compliant sand screen, according to some embodiments;

FIG. 4 illustrates an embodiment of the subject disclosure;

FIG. 5-1-5-3 illustrates degradable or dissolvable fillers, according to some embodiments;

FIG. 6-1-6-3 illustrates degradable or dissolvable fillers, according to some embodiments; and FIG. 7-1-7-5 illustrates memory shape fillers in a composite, according to some embodiments.

DETAILED DESCRIPTION

The particulars shown herein are by way of example and for purposes of illustrative discussion of the embodiments of the subject disclosure only and are presented in the cause of providing what is believed to be the most useful and readily understood description of the principles and conceptual aspects of the subject disclosure. In this regard, no attempt is made to show structural details in more detail than is necessary for the fundamental understanding of the subject disclosure, the description taken with the drawings making apparent to those skilled in the art how the several forms of the subject disclosure may be embodied in practice. Furthermore, like reference numbers and designations in the various drawings indicate like elements.

Embodiments of the subject disclosure relate to methods to increase the stiffness of the materials used in sand screens and thus increase collapse pressure.

Embodiments of the subject disclosure comprise using shape memory foam with reactive fillers for sand screen applications. Non-limiting examples, of reactive fillers include cement or magnesium oxide, which may be used as fillers in rubbers and polymers. Once placed in a fluid e.g., water, the filler reacts (chemically) with the water and potentially with the rubber and the composite stiffens and swells. These composites when manufactured as foams may be used as a sand screen material. The composite foam upon water diffusion stiffens. The goal is to improve the mechanical properties of the foam and therefore increase its resistance to wellbore collapse. Reactive composites which exhibit stiffening upon swelling have been described in recently filed commonly owned patent applications. See U.S. Ser. No. 13/004,442, entitled "OILFIELD APPARATUS AND METHOD COMPRISING SWELLABLE ELASTOMERS", filed Jan. 11, 2011 and United States Publication No.: 2011-0086942, entitled "REINFORCED ELASTOMERS" filed Oct. 9, 2009, the contents of both are herein incorporated by reference.

Figure 1:
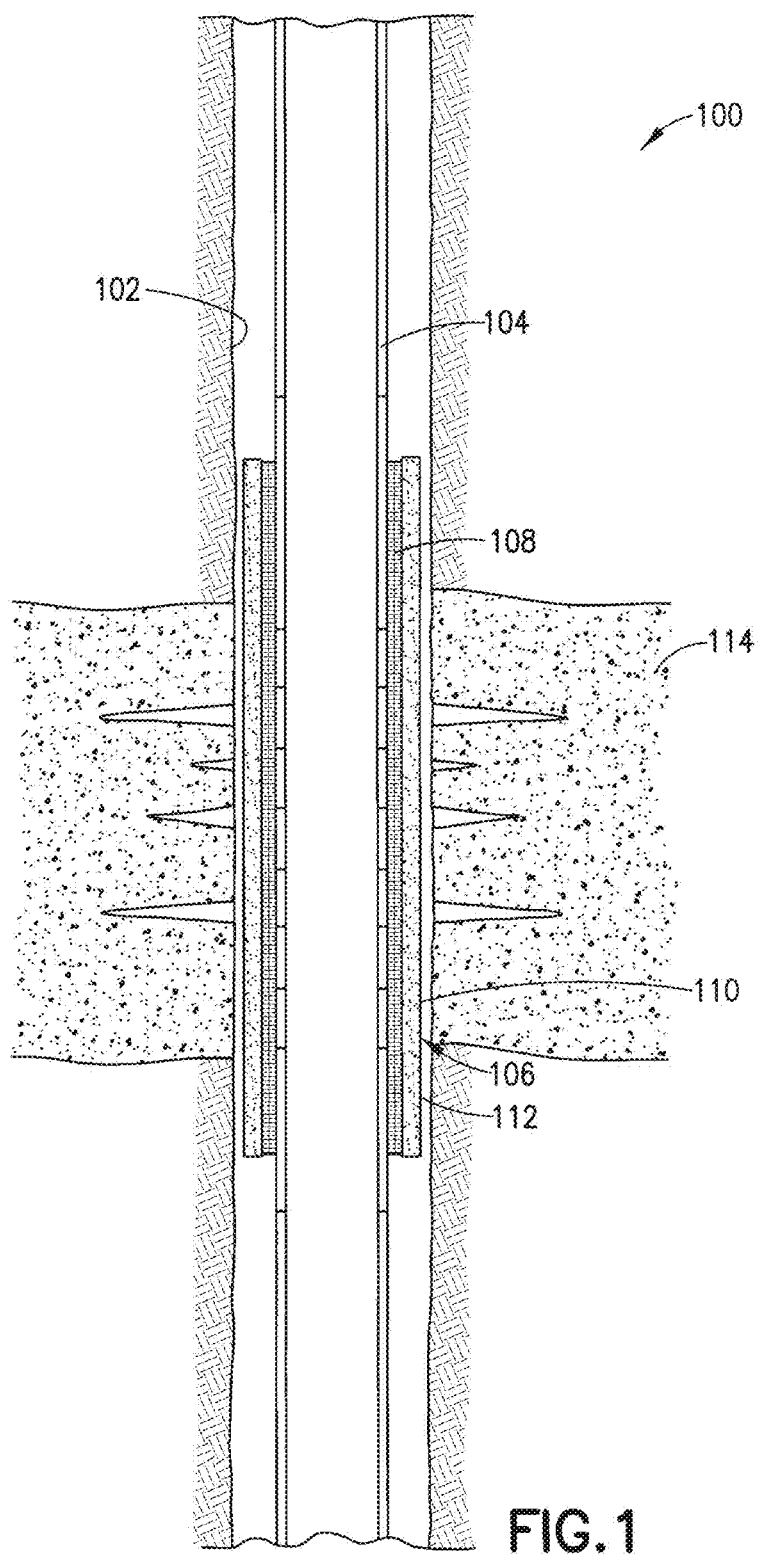
FIG. 1 is a sectional view of a sand screen positioned in a wellbore.

FIG. 1 illustrates an embodiment of the subject disclosure in use within a wellbore (100). The wellbore includes an open borehole (102), a production tubing string (104), and a sand screen (106). While wellbore (100) is illustrated as being a substantially vertical, uncased well, it should be recognized that the subject disclosure is equally applicable for use in cased wellbores as well as in horizontal and/or inclined wellbores. The sand screen (106) includes a filter member (108) and a compliant material (112). The sand screen (106) is shown positioned in the wellbore (100) adjacent a producing formation (114). In embodiments, the compliant material (112) may be the only filtration agent without the use of any filter member (108). The compliant material (112) may be a porous material and therefore acts as a filtration agent. The filter member (108) can be configured for structural support of the compliant material.

If it becomes necessary to remove the tubing (104) and the filter member (108) for some reason, (e.g., work over the well to restore production), the tubing (104) and the filter member (108) may be pulled out of the wellbore. The compliant material (112) may be detached from the filter member (108) or from the tubing (104) where a filter member (108) is not in use. The compliant material (112) may be attached to the filter member (108) or the tubing (104) with a material that may degrade with exposure to downhole temperatures, fluids or time, e.g., a glue. In other embodiments, the compliant material may be attached to the filter member (108) or the tubing (104) with a time-invariant attachment. In a non-limiting example, this may involve shear screws which would shear at a given force and release the attachment. Degradation of the material may be important in situations where the run in forces are greater than that available during fishing. If the run in forces are less than that available during fishing, degradation is not necessary. In certain situations where the compliant material (112) is not detached from the filter member (108) or from the tubing (104) there may be multiple "flexible screens" comprising the compliant material which results in the axial pull being divided. In these situations, a provision is made for a weak plane below each "flexible screen" so that the tubing below each "flexible screen" is parted and each "flexible screen" may be removed sequentially.

Figure 2:
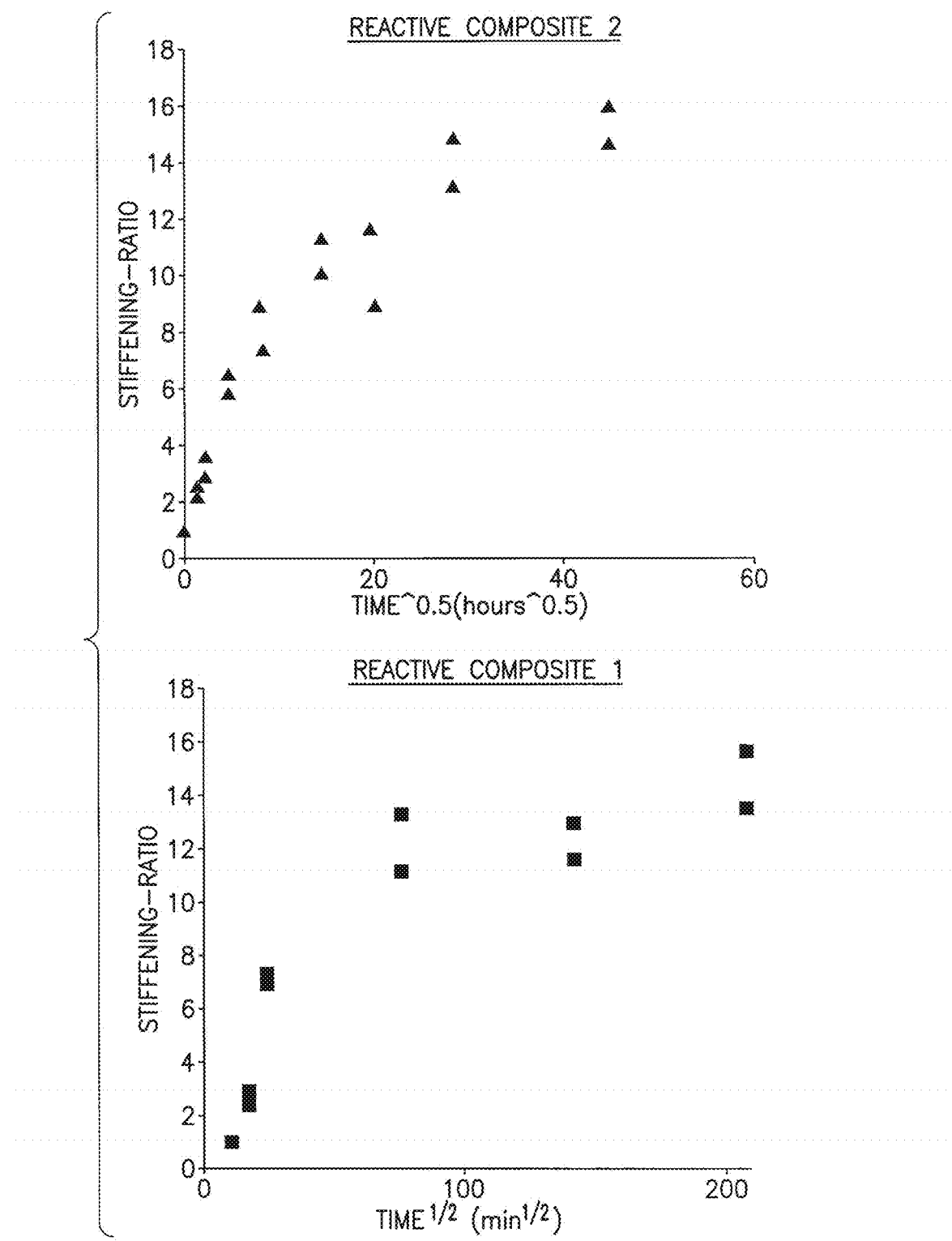
FIG. 2 illustrates graphs of stiffening ratio versus time for reactive composites, according to some embodiments.

Referring to FIG. 2, two samples are shown of composites of rubber and cementitious fillers. In non-limiting examples, cementitious fillers include Portland cement, aluminous cement, magnesium oxide, calcium oxide, fly ash, slag cement, or combinations thereof. Other non-reactive reinforcing nano-fillers may also be used. In non-limiting examples, these fillers include carbon blacks, silica, carbon nanotube, graphene, and any surface treatment on these fillers such as silane additives. The graphs show the stiffening ratio versus time for two reactive composites. The stiffening was calculated by the ratio of current to initial elastic modulus, measured by a dynamical mechanical analyzer. Upon water exposure, the modulus of the material increases by a factor of about 15 for both composites. The modulus and collapsing pressure of a foam scale linearly with the matrix modulus, therefore the foam modulus will increase by the same amount that the matrix has increased, in the above example by a factor of 15 (L. J. Gibson, M. F. Asbhy, Cambridge University Press (1988)).

Figures 1, 6:
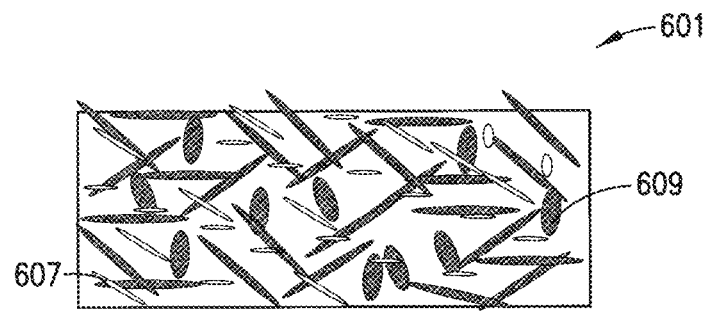
Figures 2, 6:
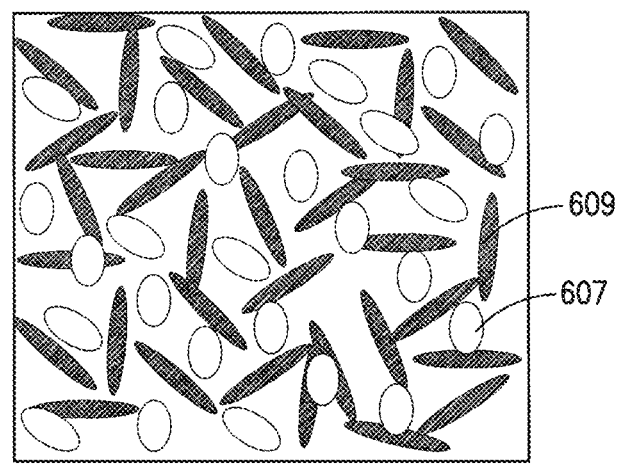
Figures 3, 6:
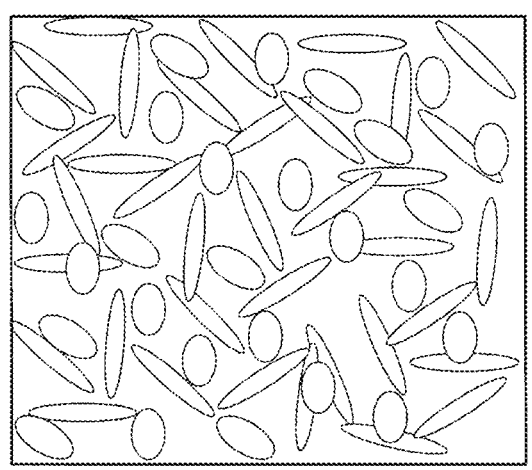

FIGS. 3-1 and 3-2 show further details of the compliant screen, according to some embodiments. FIGS. 3-1 and 3-2 show a screen (311) which comprises a compliant/conforming material (309) and a filter material or screen (307) which may be constructed in a variety of configurations, e.g., a slotted liner. FIG. 3A shows the compliant screen (311) in its initial, unexpanded state, while FIG. 3B shows the compliant screen (311) in its expanded state. The compliant screen (311) is initially compliant and in example embodiments, the compliant screen (311) comprises shape memory foam polymer, the matrix further comprises a reactive filler that stiffens the polymer and hence the foam upon reaction. The material may swell and set. For example, cement, upon contact with water or brine, will hydrate into mostly calcium silicate hydrate and calcium hydroxide; calcium oxide will hydrate into calcium hydroxide and magnesium oxide will hydrate into magnesium hydroxide.

FIG. 4 illustrates an embodiment of the compliant screen, according to further embodiments. The compliant screen material (401) is initially a soft compressed cellular solid which is placed into a wellbore (407). The material that composes the foam is a polymer (thermoset, thermoplastic or elastomer) filled with a reactive filler. The material has been processed as a cellular solid, in non-limiting examples, using expansion agents or 3D printing. The compliant screen material expands (403) once placed into the wellbore. The expansion may be triggered by raising a temperature or pumping a triggering fluid. The soft expanded cellular solid returns to its original uncompressed shape. This expansion occurs before the filler material (407) reacts, thus, the stiffness or modulus of the material is low. The expanded cellular solid returns to its original shape, but maintains the soft compliant phase which enables the material to conform to an irregular borehole wall. Upon water exposure the expanded cellular solid will stiffen due to inner filler reactions (405).

Reactive fillers used in the foam material include cementitious particles. Other filler materials include epoxy, (poly)urethanes, polyimide, polyester, polyols, acrylic polymers, and mixtures thereof. The matrix may be a thermoplastic material, a thermoset material or a rubber material. Polymers have an intrinsic shape memory property around their glass transition temperature Tg. In embodiments, these polymers can be foamed and compressed above Tg and then stored below Tg (the compressed foam will stay compressed because it is "frozen" in that state). The wellbore temperature should be above Tg to initiate the expansion when temperature is used as the trigger. Solvent presence in the polymer has a dramatic effect on Tg and may also be used as an additive in the polymer (plasticizer) or as a trigger. See van Krevelen et al., "Properties of Polymers," Elsevier 2009. The solvent can be referred to as an activation fluid and may either be present downhole or pumped downhole. Non-limiting examples of solvent for polystyrene include benzene, toluene, carbon disulfide or chloroform. The solvent presence is equivalent to an increase in temperature, causing the polymer to go through the glass transition, and expanding the foam.

In a further embodiment, dissolvable fillers and/or low temperature melting polymer fillers are incorporated into a foam material to control setting and porosity in the sand screen. These dissolvable or degradable fillers are added to a polymer or rubber composite, which may be in a foam or bulk form. The purpose of these dissolvable or degradable fillers is to control material porosity after degradation. In non-limiting examples, these fillers may control pore size and connectivity in the foam which can be used to control foam permeability and also placement and expansion options of the foam material in the wellbore.

Compliant materials used in the subject disclosure expand once placed in the wellbore. In non-limiting examples, the expansion occurs when the polymer goes through glass transition which relaxes the internal stresses. As discussed above, this can happen by raising the temperature or exposing the polymer to a particular solvent. A good solvent has the ability to change the glass transition temperature. The expansion may also occur by degrading or dissolving a layer or film which surrounds the compliant material in a collapsed or compressed state.

Compliant materials used in the subject disclosure allow the flow of fluid and small particles through the interconnected porous network. The particle size may be in the range of 1-100 microns. In some embodiments, the compliant material may be created by manufacturing a cellular solid with a connected porosity. For example, chlorofluoroalkane blowing agents can be used to manufacture polyurethane foam. In other embodiments, degradable or dissolvable fillers may be incorporated into the composite. These fillers form a percolated network and will melt or dissolve once the material is placed into the wellbore, resulting in a cellular solid with connected porosity.

FIG. 5-1-5-3 depicts a further embodiment of the subject disclosure. In a first stage (509), the composite material is placed into the wellbore. In a second stage (511), the fillers degrade or dissolve and finally in a third stage (513) the matrix swells and fills the annulus in the wellbore between the tubing and the formation. The composite material (501) comprises dissolvable or degradable fillers (503) which will create a permeable material after placement in a wellbore. The composite material (501) is placed into a wellbore and the dissolvable or degradable fillers (503) degrade or dissolve in the wellbore, either upon exposure to downhole fluids and temperature or upon exposure to a fluid pumped from the surface leaving pores in the polymer matrix. The typical downhole temperature for a formation is about 82° C. to 150° C., and in certain formations for shale gas, the BHT (bottom-hole temperature) could be in the range of about 38° C. to 82° C.; and in other formations, the BHT could be about 250° C. Non-limiting examples of fluids that are pumped downhole include water, water solution of polymers, surfactant, brine, and mixtures of water and solid particles and other functional additives. The composite matrix may also swell and expand. Embodiments disclose a polymer or rubber compounded with additives such as dissolvable or degradable fillers.

In FIG. 5-1-5-3, the matrix (505) may be a polymer, rubber or foam comprising reactive fillers. The matrix may also comprise swellable material. The matrix will swell upon exposure to the fluid and will stiffen if reactive fillers are present in the matrix. A foam matrix manufactured with degradable or dissolvable fillers results in foam with controlled pore sizes and pore distributions.

If the initial polymer/rubber is a bulk non-porous material the degradable/dissolvable fillers form a connected network which improves permeability. Block copolymers of degradable and non-degradable fillers with cylindrical or double gyroid morphologies have been used to create porosity with the degradable block being removed to create nanopores (See J. Am. Chem. Soc., 2002, 124 (43) pp. 12761-12773 and Nano Letters (2009) 9 (8), pp 2807-2812). The bi-continuous nature of gyroid morphology may give a connected network while cylinders may be aligned to create pores through the matrix. Co-continuous composite material may also be created using 3D printers. See Wang et al., "Co-continuous composite materials for stiffness, strength and energy dissipation," Advanced Materials 23, 1524-1529.

In FIG. 6-1-6-3, the composite (601) comprises dissolvable or degradable fillers (609) which are used to create a permeable material after placement in a wellbore. The composite (601) is a cellular solid and expands by relaxing internal stresses in the foam. The foam matrix in this example has limited porosity (607) and may have non-connected pores as can be seen in FIG. 6-1. After placement downhole and exposure to a trigger, in non-limiting examples, temperature or fluid, the fillers will degrade or dissolve resulting in an increase in porosity and/or permeability. Simultaneously, the composite expands because of the memory shape property (matrix goes through Tg) or because the matrix swells by solvent absorption. FIG. 6-1 depicts the composite foam material (601) with limited porosity (607) and a plurality of dissolvable or degradable fillers (609). The composite foam material (601) is placed in a wellbore. FIG. 6-2 shows the composite foam material (603) expanded (609) with an increase in porosity (607). The composite foam material (603) expands when heated or the matrix swells. Finally in FIG. 6-3, the fillers degrade or dissolve (605) thus increasing porosity and/or permeability.

In a further embodiment the matrix is a foam rubber with no memory shape function. In this case the matrix is stored compressed using a sleeve that dissolves or degrades downhole and allows the foam matrix to expand.

In embodiments, the matrix may be a shape memory polymer. This includes any polymer where Tg or Tm may be adjusted close to downhole temperatures.

In embodiments the matrix is an elastomer. Elastomers that are particularly useful in the present invention include nitrile rubber (NBR), hydrogenated nitrile rubber (HNBR), carboxylated nitrile rubber (XNBR), carboxylated hydrogenated nitrile rubber (XHNBR), silicone rubber, ethylene-propylene-diene copolymer (EPDM), fluoroelastomer (FKM, FEPM) and perfluoroelastomer (FFKM), polyurethane rubber, and any mixture or blends of the above. "Elastomer" as used herein is a generic term for substances emulating natural rubber in that they stretch under tension, retract rapidly and substantially recover their original dimensions. The term includes natural and man-made elastomers, and the elastomer may be a thermoplastic elastomer or a non-thermoplastic elastomer. The term includes blends (physical mixtures) of elastomers, as well as copolymers, terpolymers, and multi-polymers.

In embodiments, the degradable fillers include degradable polymers that decompose into monomers and soluble polymers that dissolve in the liquid. Non-limiting examples of degradable polymers include polyesters. Examples of polyesters include poly(lactic acid) (PLA), polyglycolic acid, polycaprolacton (PCL) polybutylene succinate, polybutylene succinate-co-adipate, PBT, PET and copolymers or blends.

Non organic dissolvable fillers include salts. In embodiments, the degradation kinetics of these polymers may be controlled by reactive fillers. Non-limiting examples of reactive fillers include MgO, ZnO, Ca(OH)$_2$, CaO, Mg(OH)$_2$, ZnCl$_2$, MgCl$_2$, CaCl$_2$, NiCl$_2$, CoCl$_2$, CaCO$_3$, Na$_2$CO$_3$, K$_2$CO$_3$, Borax, and other additives of organic base, such as imidazole, Bu$_4$N$^+$Br$^-$, Me$_3$N/BnCl$^-$, (NH$_4$)$_2$S$_2$O$_8$, urea, urea derivatives, 4-Dimethylaminopyridine, DBU, Aminoguanidine hydrocarbonate, that can accelerate ester hydrolysis. Examples of soluble polymers which may be soluble in water or in hydrocarbon include PVOH, PVOH copolymers, sulfonated polyesters, polyacrylic acid, polyacrylamide, PVP and EVA.

Non-limiting examples of low temperature melting polymer fillers include polystyrene, LDPE, PVC, EVA, modified EVA, and ionomers of EVA.

Shape memory materials may comprise one or more materials. For example, shape memory materials can be metallic and/or polymeric. The metallic type of shape memory material comprises a shape memory alloy that gains its shape memory effect from a solid-state phase change, i.e., molecular rearrangement. This type of phase change is similar to the phase change that occurs in transitioning from solid to liquid and vice versa in that a molecular rearrangement occurs, but the molecules remain closely packed. However, the substance remains in a solid-state. In many applications, a temperature change around 10° C. is adequate to initiate a solid-state phase change. Examples of suitable metallic shape memory materials are nickel-titanium alloys. Other shape memory materials are copper-aluminum-nickel alloys, copper-zinc-aluminum alloys, and iron-manganese-silicon alloys. Additionally, composite shape memory materials can be used. For example, the shape memory material may comprise polymeric shape memory composites, metal/polymer shape memory materials, e.g., metal bonded polymer parts, polymer or metal coated/layered shape memory materials, e.g., rubber coated shape memory polymer parts and other composite memory materials. See Wei et al., "Shape memory materials and hybrid composites for smart systems Part II Shape-memory hybrid composites," J. Mater. Sci. 1998, 33, 3763.

In embodiments, memory shape function is added to rubber by the introduction of memory shape fillers. These fillers may be used to maintain the foam in a compressed position thus giving a shape memory property to the rubber composite. In embodiments, the rubber comprises low temperature melting polymer fillers. Initially, the composite is heated above the polymer melting temperature and the rubber is deformed. The composite is then cooled but maintains its deformation. The fillers are now in a solid state and prevent the composite from returning to its initial shape even though the rubber matrix would tend to do so. Once the temperature is increased again the polymeric fillers will melt and the composite will return to its initial shape. In embodiments, the fillers may degrade after placement in the well or upon exposure to downhole fluids or pumped fluids. FIG. 7-1-7-5 depicts the shape memory fillers. In FIG. 7-1, the composite (701) comprises shape memory fillers (703) in a rubber matrix (705). In FIG. 7-2, the material (707) is compressed at high temperature with the composite maintaining its deformation. In FIG. 7-3, the composite is cooled (709) but the material maintains its deformation. The material is then placed in the well (711) and once the temperature increases the polymeric fillers will melt and the composite will return to its initial shape (713).

In further embodiments, the shape memory fillers may be used in a foam. The fillers are added to the foam material and provide a shape memory property to the foam composite. The matrix may be a shape memory polymer. Any shape memory polymer where Tg or Tm may be adjusted close to downhole temperatures may be used. The matrix may be a rubber, non-limiting examples, include NBR, HNBR, neoprene, EPDM, FKM and FFKM. Examples of low temperature melting polymer fillers include polystyrene, LDPE, PVC, EVA, modified EVA and ionomers of EVA.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. §112, paragraph 6 for any limitations of any of the claims herein, except for those in which the claim expressly uses the words 'means for' together with an associated function.

What is claimed is:

1. A sand screen apparatus for use in a well that intersects a hydrocarbon formation, comprising:
   a composite, the composite having a compressed state and an expanded state;
   the composite comprising a base polymer, one or a plurality of reactive fillers, and a plurality of dissolvable or degradable fillers dispersed within the composite;
   wherein the one or the plurality of reactive fillers react with the base polymer in the expanded state after exposure to a first trigger.

2. The screen of claim 1, wherein the composite is one of a foam composite or a bulk composite.

3. The screen of claim 1, wherein the composite expands after placement in the well and conforms to a wellbore wall.

4. The screen of claim 1, wherein the composite stiffens after exposure to the first trigger.

5. The screen of claim 4, wherein the first trigger is a temperature change.

6. The screen of claim 4, wherein the first trigger is a fluid introduced into the well.

7. The screen of claim 1, wherein the reactive fillers are selected from a group consisting of Portland cement, aluminous cement, fly ash, slag cement, MgO, ZnO, Ca(OH)$_2$, CaO, Mg(OH)$_2$, ZnCl$_2$, MgCl$_2$, CaCl$_2$, CaCO$_3$, Na$_2$CO$_3$ or K$_2$CO$_3$, and combinations thereof.

8. The screen of claim 1, wherein the composite comprises a shape memory alloy.

9. The screen of claim 8, wherein the shape memory alloy is nickel-titanium, copper-aluminum-nickel, copper-zinc-aluminum, iron-manganese-silicon; and combinations thereof.

10. The screen of claim 1, wherein the composite comprises a low temperature melting polymer.

11. The screen of claim 10, wherein the low temperature melting polymer is a polystyrene, LDPE, PVC, EVA; and combinations thereof.

12. The screen of claim 1, wherein the composite has a modulus increase from the compressed state to the expanded state.

13. The screen of claim 1, wherein the base polymer is a thermoplastic, a thermoset or a rubber.

14. The screen of claim 13, wherein the rubber is NBR, HNBR, neoprene, EPDM, polyurethane, FKM or FFKM; and combinations thereof.

15. The screen of claim 1, wherein the composite matrix is a shape memory polymer.

16. The screen of claim 1, wherein the plurality of dissolvable or degradable fillers are configured to control porosity of the composite.

17. The screen of claim 16, wherein the plurality of dissolvable or degradable fillers comprise degradable polymers.

18. The screen of claim 17, wherein the degradable polymers are polyesters.

19. The screen of claim 18, wherein the polyesters are selected from the group consisting of poly(lactic acid) (PLA), polyglycolic acid, polycaprolacton (PCL) polybutylene succinate, polybutylene succinate-co-adipate, PBT, PET; and combinations thereof.

20. The screen of claim 2, further comprising a degrading or dissolving film wherein the degrading or dissolving film surrounds the composite in the compressed state.

21. The screen of claim 1, further comprising a plurality of fillers wherein the plurality of fillers have shape memory properties.

22. The screen of claim 21, wherein the plurality of fillers maintain the composite in a compressed state.

23. A well completion method, comprising:
covering at least one base pipe with a composite comprising a base polymer and one or a plurality of reactive fillers;
running the base pipe to a location in a wellbore;
expanding the composite;
conforming the composite to the wellbore wall;
stiffening the composite; and
filtering fluids through the composite to said base pipe;
detaching the composite from the base pipe; and
lifting the base pipe out of the wellbore.

24. The well completion method of claim 23, further comprising a support member.

25. The well completion method of claim 24, wherein the support member is a screen.

26. A method of completing a wellbore in a subterranean formation, comprising:
positioning an expandable sand control device in the wellbore and forming an annulus between the sand control device and the wellbore, the sand control device having a foam composite comprising a base polymer, one or a plurality of reactive fillers, and a plurality of dissolvable or degradable fillers dispersed within the composite, the foam composite designed to expand and fill the annulus.

* * * * *